May 15, 1956 C. D. PROSSER Re. 24,151

WAGON ELEVATOR THROWOUT CLUTCH FOR AGRICULTURAL IMPLEMENTS Orig. 2,694,280

Original Filed Sept. 9, 1952 3 Sheets-Sheet 1

INVENTOR.
Clinton D. Prosser
Paul G. Pippel
Atty

WAGON ELEVATOR THROWOUT CLUTCH FOR AGRICULTURAL IMPLEMENTS

Original Filed Sept. 9, 1952 3 Sheets-Sheet 2

INVENTOR.
Clinton D. Prosser
BY Paul O. Piepel
Atty.

WAGON ELEVATOR THROWOUT CLUTCH FOR AGRICULTURAL IMPLEMENTS

Original Filed Sept. 9, 1952 3 Sheets-Sheet 3

INVENTOR.
Clinton D. Prosser
BY Paul O. Piper
Atty

United States Patent Office

Re. 24,151
Reissued May 15, 1956

24,151

WAGON ELEVATOR THROWOUT CLUTCH FOR AGRICULTURAL IMPLEMENTS

Clinton D. Prosser, Rock Island, Ill., assignor to International Harvester Company, a corporation of New Jersey Original No. 2,694,280, dated November 16, 1954, Serial No. 308,601, September 9, 1952. Application for reissue May 31, 1955, Serial No. 512,357

11 Claims. (Cl. 56—15)

Matter enclosed in heavy brackets [ ] appears in the original patent but forms no part of this reissue specification; matter printed in italics indicates the additions made by reissue.

This invention relates to a wagon elevator throw-out clutch for agricultural implements.

Agricultural implements, and more particularly those implements which employ elevating means for conveying a harvested crop to a trailing wagon such as corn pickers, require some means to insure the discharge of crop material from the wagon elevator to the trailing wagon. This is especially true when it is understood that at the end of a row of crop it is necessary to turn the implement around to start down a succeeding row of crop to be harvested. When the implement is being turned it has relative angular movement with respect to the trailing wagon and with a conventional wagon elevator the discharge end thereof swings to a position to one side of the box portion of the trailing wagon. Various means have been employed to insure delivery of harvested crop to the trailing wagon and eliminate any loss of crop during its passage from the harvesting implement to the receiving wagon. Some of these means are in the form of swingable discharge spouts for wagon elevators which are held in position over the trailing wagon, whereas still other means are in the form of clutches which render inoperative the wagon elevator during those times when the discharge spout thereof is not disposed over the trailing crop receiving wagon. Certain of these clutch means have been manually operable and still others have been automatically operable in response to various means on the harvesting implement.

It is a principal object of the present invention to provide wagon elevator de-clutching means for a harvesting implement automatically operable in response to necessary raising of the harvesting elements normally at the end of a field and manually re-engageable by means separable from the automatic actuating means.

An important object of this invention is the provision of means for effecting the engagement and/or disengagement of a wagon elevator clutch.

Another important object of this invention is to supply in a corn picker, linkage means associated with the raising and lowering of the corn crop gathering units for effecting the disengagement of a wagon elevator clutch whenever the gathering units are raised their full distance.

Another and further important object of this invention is to provide lost motion means in linkage in a wagon elevator clutch actuation whereby the normal range of vertical adjustment of the harvesting units will not interfere with operation of the wagon elevator but adjustment of the harvesting units to their maximum raised position will automatically cause disengagement of the wagon elevator clutch.

Another and still further important object of this invention is the provision of manually operable clutch means superimposed on and over an automatically operable clutch disengaging means whereby the clutch may be manually re-engaged after it has been automatically disengaged.

Still another object of this invention is to supply clutch disengaging linkage with over-center actuating means whereby the clutch is positively disengaged upon initial actuation thereof.

Another and still further important object of this invention is to provide a compound linkage mechanism for the actuation of a wagon elevator clutch means whereby a longitudinal movement of an operating link transforms the longitudinal movement into transverse movement for causing positive clutch operation.

Other and further important objects and advantages will become apparent from the disclosures in the following specification and accompanying drawings.

Figure 1:
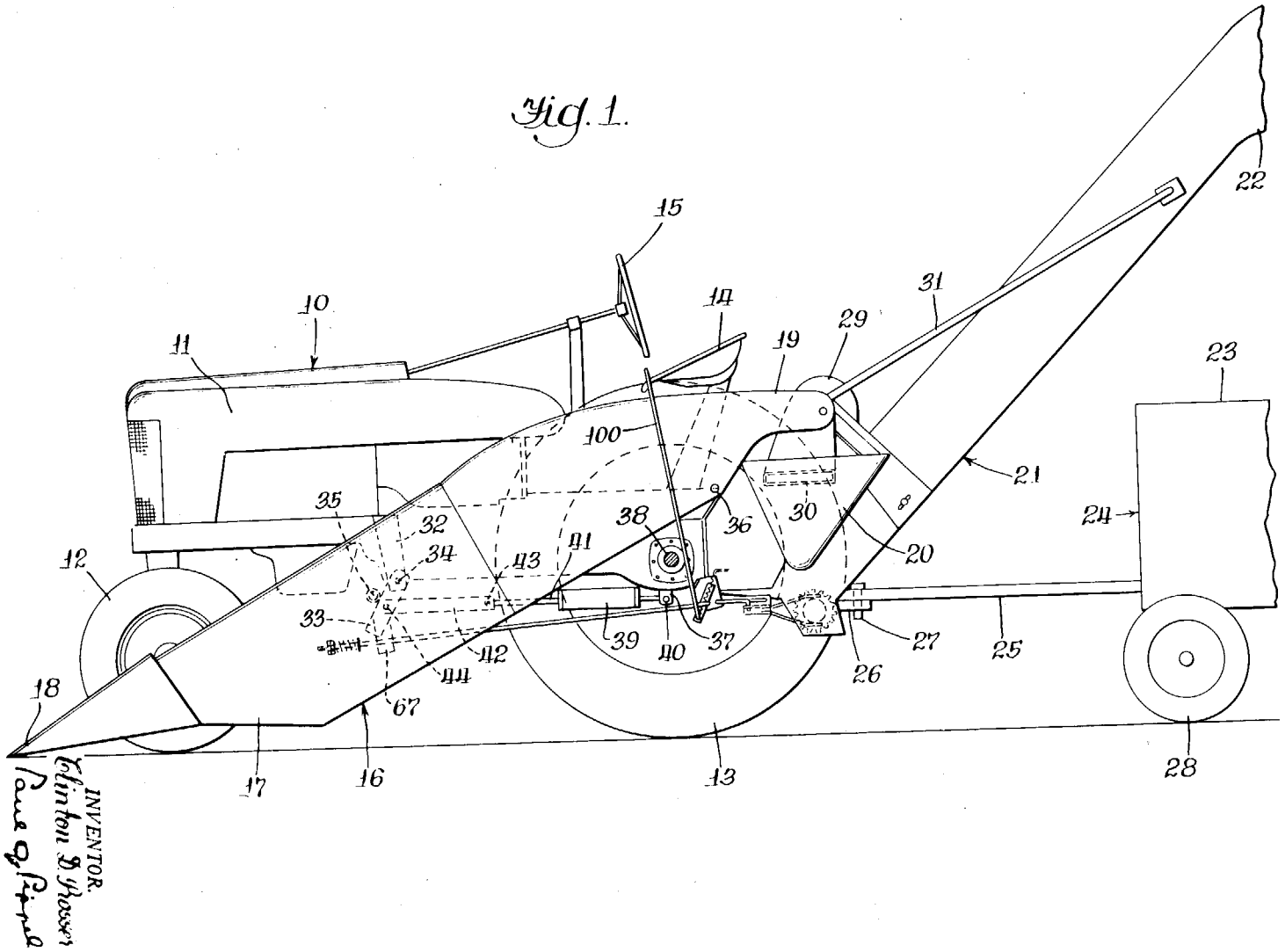
Figure 1 is a side elevational view of the tractor-mounted corn picker having the wagon elevator throwout clutch of this invention incorporated thereon.

As shown in the drawings the reference numeral 10 indicates generally an agricultural type tractor including a longitudinally disposed engine and chassis 11 having its forward end carried by relatively small dirigible wheels 12 only one of which has been shown and its rearward end supported on relatively widely spaced apart large driving and traction wheels 13 only one of which has been shown. An operator's seat 14 is positioned on the rearward portion of the chassis enabling an operator of the tractor to easily control the steering wheel 15 and other operating pedals and levers (not shown) effecting operation of the tractor and its various operating parts.

As shown in Figure 1, a corn harvester 16 is mounted on the tractor and movable therewith so that when the tractor is driven through a field of standing corn it will effect a harvesting of that corn crop. The corn harvester 16 includes relatively longitudinally extending gathering elements 17. The gathering units 17 have spaced divider points 18 which are adapted to pick up down corn and enable the gathering units 17 to engage the stalk and cause removal of the ear or ears of corn therefrom. Similarly the gathering units 17 are provided with ear snapping means (not shown) and suitable ear conveyor means adapted to elevate the harvested ears of corn to the extreme end 19 of the gathering units 17. The end 19 of the gathering unit constitutes a discharge spout, or the like, which is disposed directly over a hopper 20 adapted to receive the harvested ears of corn and deliver them to a wagon elevator 21 for upward and rearward conveying to the discharge end 22 thereof, which is disposed over a box portion 23 of a trailing wagon 24. The wagon 24 is provided with a forwardly extending tongue 25 which is hingedly fastened to a drawbar 26 of the tractor 10. A pin 27 is arranged and constructed to pass vertically through the tongue 25 and the drawbar 26 thereby holding the vehicles together and providing for a pulling of the trailing wagon 24 whenever the tractor 10 is propelled. The trailing wagon 24 is supported at its forward end by a steerable wheel truck 28 which is turnable by movement of the tongue 25, thereby facilitating the natural tracking of the trailing wagon 24 with respect to the pulling tractor 10.

A cleaning fan 29 is mounted on the corn picker 16 adjacent the discharge spout 19 of the gathering units 17. The fan has an air discharge opening 30 through which a blast of air is passed over and through the ears of corn as they are dropped from the gathering units to the hopper 20. Any light foreign matter will be discharged over the side of the hopper 20 and will not be permitted to reach the wagon elevator which theoretically at least will contain only cleaned ears of corn for delivery to the trailing wagon.

In the operation of these articulated vehicles traversing a field of standing corn the tractor is propelled forwardly in such a manner that the spaced apart divider points 18 of the gathering units 17 will guide the standing and down stalks into the gathering units whereafter the ears of corn are snapped or otherwise stripped from the stalks, and the ears carried upwardly and rearwardly through the gathering units to the rearmost end thereof at 19 whereafter the ears are dropped through the scope of operation of the cleaning fan 29 and its discharge spout 30. The cleaned ears of corn are received by the hopper 20 positioned transversely across the rear of the tractor and the hopper is in communication with the wagon elevator 21 whereby the ears are elevated by the wagon elevator 21 and discharged through the upper end 22 thereof for deposit in the wagon box 23 of the trailing wagon 24. A brace member 31 is provided between the wagon elevator and the corn picker in order to maintain the elevator in its upwardly and rearwardly extending angular position.

The tractor 10 is equipped with a depending bracket 32 beneath a central portion of the engine and chassis 11. A lifting link 33 is pivotally attached at 34 at the lower end of the bracket 32. A cross rod or pipe 35 is mounted on the corn harvester 16 and it should be apparent that a swinging of the link 33 will cause a raising and/or lowering of the gathering units 17 of the corn picker, depending upon the direction of movement of the lifting link 33. The corn harvester 16 is pivotally mounted at 36 on the tractor 10 to facilitate the raising and lowering of the gathering units 17. It should be apparent that the movement of the lifting link 33 may be by manual or power means without effecting the operation of the clutch engaging and disengaging apparatus of this invention. For purposes of convenience a power means has been shown to effect movement of this lifting link and this will be hereinafter described.

A bracket 37 depends from the tractor chassis 11 just beneath the rear axle housing 38 of the tractor which carries the spaced apart large traction wheels 13. A fluid operated cylinder 39 is pivotally attached at 40 to the depending fixed bracket 37. A forwardly disposed extensible and retractable piston 41 is fixed to a connecting link 42 as at 43 and a joining of the rigid link 42 with the lifting link 33 as shown at 44 provides for a direct angular change in the position of the lifting link 33 upon changes in the extension of the fluid operated cylinder piston 41. Corn and certain other crops such as row crops are planted in hills with relatively deep furrows therebetween. The agricultural tractor wheels are arranged in such a manner that the wheels will ride down in the furrows or valleys between the hills in which the crop is growing. Thus when the tractor is turned at the end of a row of corn or the like the gathering unit divider points 18 would normally fall sufficiently downwardly to engage and become embedded in the sides of adjacent hills formed by furrows. The raising and lowering of the gathering units 17 of the corn harvester 16 permits the harvesting of the crop such as corn at any vertical level and also permits the raising of the gathering units sufficiently high so that the divider points 18 will readily clear the hills and furrows at the end of any row of corn when the tractor-mounted harvester is being turned.

During turning of the tractor-mounted implement the rearwardly disposed wagon elevator 21 swings outwardly away from its position directly over the wagon box 23 and does not return to a position directly over the box until the articulated vehicles again resume a straight line relationship, at which time the harvesting implement is coming back through an adjacent row of crop to be harvested and the trailing wagon is again positioned behind the tractor ready to receive material harvested.

Figure 2:
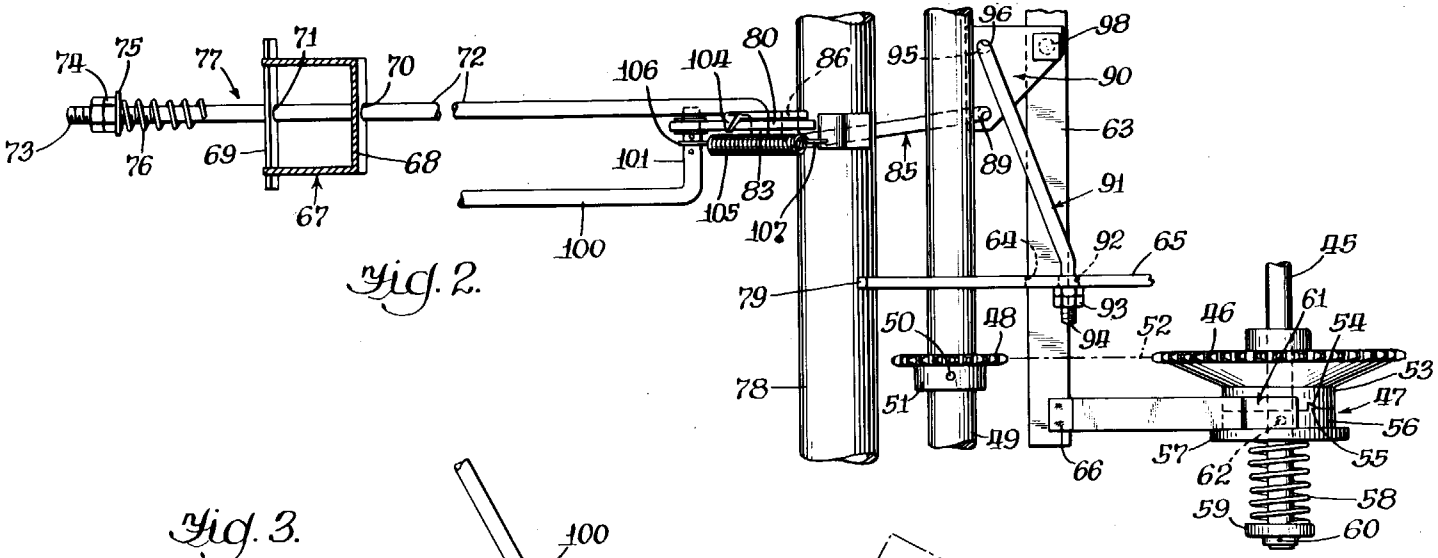
Figure 2 is an enlarged top plan view partially in section of a detail of a portion of the device as shown in Figure 1.

During the time when the wagon elevator discharge spout 22 is not disposed over the wagon box 23 it is essential that the elevator mechanism be halted so that harvested and cleaned ears of corn or other crop material will not be discharged to the ground and thus lost. As best shown in Figure 2 a shaft 45 at the lower end of the power operated wagon elevator 21 provides the means for driving the elevating conveyor which carries the crop material upwardly for discharge into the trailing wagon. A sprocket 46 is journaled over the shaft 45 and by means of a clutch mechanism 47 rotational drive may be delivered from the sprocket 46 to the shaft 45. A spaced apart sprocket 48 in alignment with the sprocket 46 is fastened to a drive shaft 49 by means of a pin 50 passing through a collar 51 integral with the sprocket 48. A chain 52 joins the aligned sprockets 46 and 48, thus delivering rotational drive from the shaft 49 to the shaft 45 dependent upon the engagement or disengagement of the clutch mechanism 47. The clutch 47 includes a hub portion 53 forming a part of the sprocket 46. The hub or sleeve 53 is provided with notches 54 around the periphery thereof to be engaged by projections 55 on a cooperative clutch part 56 which is fastened to the shaft 45 by means of a spline or the like (not shown) which permits relative longitudinal sliding movement but prohibits separate rotational movement. An annular flange 57 is provided on the clutch part 56. A spring 58 abuts the annular flange 57 reacting against a collar 59 fastened to the shaft 45 by means of a pin 60. The normal tendency of the spring 58 is to urge the clutch part 56 into engagement with the clutch part 53 of the sprocket 46 and thus insure rotational drive of the elevator shaft 45. Disengagement or actuation of the clutch mechanism 47 is accomplished by means of a fork 61 adapted to engage the clutch part 56 by means of a cross pin 62. Transverse movement of the fork 61 thus causes a sliding of the clutch part 56 relative to the shaft 45 and causes a separation of the clutch engaging elements 54—55 as the normal tendency of the spring 58 is overcome. A transversely positioned bar 63 is guided for transverse sliding movement only within openings 64 only one of which has been shown in frame members 65 only one of which has been shown. The fork structure 61 of the clutch mechanism 47 is welded or otherwise fastened as at 66 to the sliding bar 63. The fork 61 thus moves simultaneously with movements of the bar 63 to cause engagement or disengagement of the clutch mechanism 47.

Figure 3:
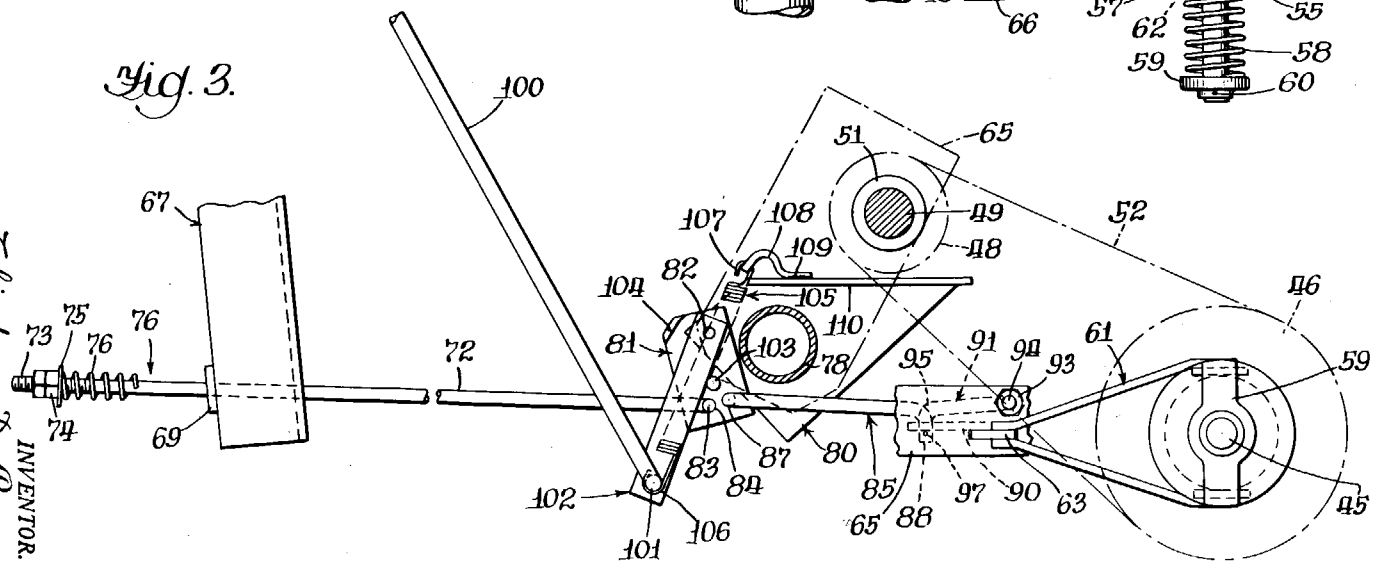
Figure 3 is a side elevational view partially in section of the device as shown in Figure 2.

As best shown in Figure 1 an auxiliary arm 67 depends from the lifting link 33 beneath the tractor 10, and as shown in Figures 2 and 3 the auxiliary arm 67 is provided with a channel portion 68 and an integral cross member 69. Aligned openings 70 and 71 in the channel and cross member respectively permits free sliding movement of the auxiliary depending arm 67 along a rod 72 which extends generally longitudinally of the tractor and of the corn harvester. The forward end of the rod 72 is threaded as at 73 and receives locking nuts 74 arranged to engage a washer 75 which in turn holds a coil spring 76 in position around the rod 72. There is no means for maintaining the coil spring 76 against the washer 75 but it acts solely to cushion the impact occasioned when the lifting link 33 is raised by reason of operation of the fluid operated cylinder and piston, at which time the auxiliary arm 67 engages the rod 72 through the medium of the spring 76, washer 75 and lock nuts 74. The spaced apart position as shown at 77 between the crossbar 69 of the auxiliary arm 67 and the washer 75 permits the normal range of swinging movement of the crop gathering units 17 to be effected without causing a movement of the rod 72 by the auxiliary arm 67. Simultaneous movement of the rod 72 with the auxiliary arm 67 occurs only when the lifting link 33 is raised substantially its maximum distance at which time the rod 72 will be pulled forwardly. It should be remembered that the only time the gathering units of the corn picker are raised their full distance is when the machine is being turned around at the end of a row preliminary to commencing the harvesting of a succeeding row of crop. Movement of the rod 72 forwardly automatically causes a lateral shifting of the bar 63 and thus a disengagement of the clutch mechanism 47 to terminate operation of the wagon elevator through the medium of a compound linkage and actuator mechanism associated with the rod 72 and the cross sliding bar 63. It is, of course, desirable to terminate operation of the wagon elevator during both transport of the implement and during turning of the implement, and it is thus not essential for the operator to remember to disengage a wagon elevator clutch but this is done automatically with the device of this invention when the gathering units are raised substantially their maximum distance.

Figure 4:
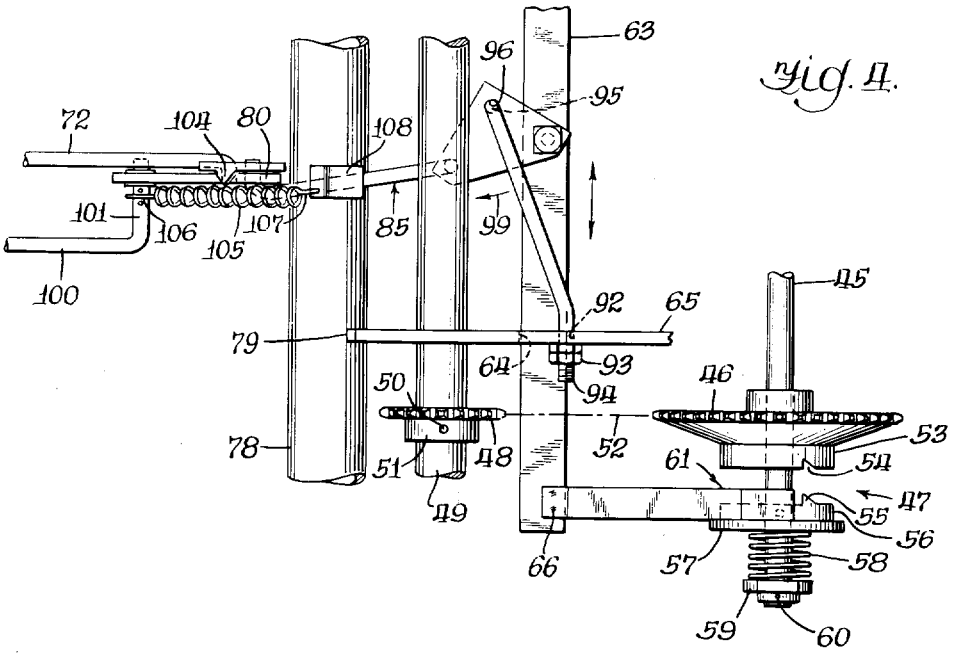
Figure 4 is a top plan view with parts in section of a portion of the device such as shown in Figure 2 with the elements in shifted operating position.

A torque tube 78 forms a part of the frame structure 65 inasmuch as that element is fixedly attached to the torque tube 78 at 79. A plate member 80 is welded or otherwise fastened to the torque tube 78 at a spaced apart position from the frame member 65. As best shown in Figure 3 a bracket-like plate 81 is hinged at 82 to the fixed supporting structure plate 80. The rearmost end of the rod 72 is turned inwardly as at 83 and engages an aperture 84 in the swinging bracket-like plate 81. It will thus be apparent that forward movement of the rod 72 will effect a swinging movement of the plate 81 about its hinge 82. A connecting link 85 similarly has a bent end portion 86 engaging an aperture 87 in the plate 81 spaced from the aperture 84. The rearward end of the connecting link 85 has a downwardly bent portion 88 engaging an aperture 89 in a plate member 90. The plate 90 distinguishes from the plate 81 in that it lies in a horizontal plane whereas the plate 81 is disposed in a vertical plane. A rod 91 is carried by the support member 65. The rod 91 passes freely through an aperture 92 in the support member 65 and nuts 93 engage a threaded end portion 94 of the portion of the rod 91 passing through the support member 65. It is thus apparent that the rod 91 may move toward and through the support member 65 but the lock nuts 93 prevent further movement of the rod 91 in a direction away from the support member 65. The rod 91 is provided at its unsupported end with a downwardly bent portion 95. The portion 95 passes downwardly through an aperture 96 in the plate 90. A cotter pin or the like 97 passes through the lower end of the bent end portion 95 beneath the level of the horizontally disposed plate 90. The plate 90 is pivotally fastened to the crossbar 63 at 98. It should be apparent that an endwise pulling on the rod 72 by movement of the depending auxiliary arm 67 will cause a transverse shifting movement of the crossbar 63 through the compound linkage composed of the vertically pivotable plate 81 and the horizontally pivotable plate 90. As best shown in Figure 3 the connecting rod or link 72 will effect a swinging movement of the plate 81 about its hinge mounting 82. Movement of the plate 81 causes a concurrent movement of the link 85 as this link is attached to the plate 81. Now as viewed in Figure 2, the link 85 exerts a pull on the plate 90 causing it to swing in the direction of the arrow 99 as viewed in Figure 4 with the aperture 96 constituting the hinge point of the plate 90. The hinging of the plate 90 about the aperture 96 and more particularly about the depending end 95 of the supporting link 91 is relatively free to assume any necessary position as required to shift the bar 63 laterally. As shown in Figure 4 the bar 63 has been shifted laterally outwardly to effect a disengagement of the clutch 47. As previously stated the bar 63 is supported in closely confined apertures 64 in the supporting members 65, thus prohibiting longitudinal movement of the bar in the line of draft of the tractor-mounted implement. There has thus been accomplished a transmittal of longitudinal sliding movement to transverse sliding movement to occasion a disengagement of the wagon elevator clutch 47 at a time when the gathering units of the corn picker are raised for transport or turning at the end of a row of corn.

Figure 5:
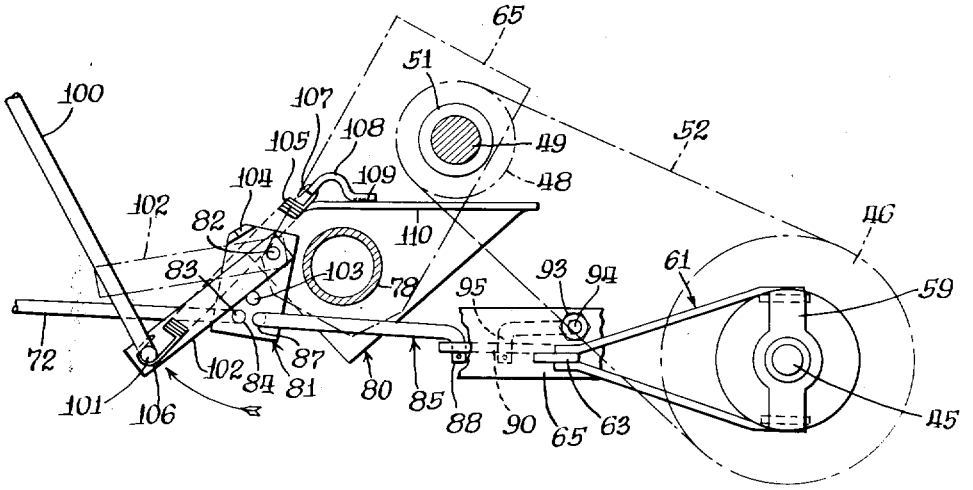
Figure 5 is a side elevational view with parts in section of the device as shown in Figure 4.

It will be seen that when the gathering units are again lowered to resume the picking of corn there is no interconnection between the auxiliary depending arm 67 and the rod 72 to cause the clutch 47 to become re-engaged. Thus the wagon elevator does not resume operation even though the corn picker is resuming its harvesting operation. This feature is especially desirable inasmuch as the trailing wagon has not necessarily reached a straight line relationship with the pulling tractor when the tractor and its mounted implement commences the harvesting of an adjacent row in the opposite direction. In other words, the trailing wagon is still turning the corner when the gathering units are picking up corn from the next row. Obviously then if the wagon elevator were immediately restarted the corn delivered from the discharge end 22 of the elevator 21 would be thrown to the ground and lost. Therefore, a manual re-engaging means is employed in cooperation with the automatically disengageable clutch. As best shown in Figures 1, 3 and 5 a hand engaging lever or rod 100 is located closely adjacent the operator's seat 14 of the tractor 10, thus insuring that the operator may easily and quickly effect re-engagement of the wagon elevator clutch whenever he deems it desirable. Similarly the wagon elevator clutch may be manually disengaged by movement of this same hand lever 100. The lever 100 is pivotally fastened at 101 to a link 102 which is hinged at 82 over the plate 81. There is no direct interconnection between the link 102 and the plate 81 other than that they are both hinged on the same hinge pin 82. A pin or projection 103 is provided on the plate 81 spaced from the hinge mounting 82 and from the apertures 84 and 87 which receive the ends of the links 72 and 85 respectively. When the operator pushes the lever 100 downwardly the link 102 abuts the projection 103 which is a rigid part of the plate 81 and thus the plate 81 and link 102 swing together as a unit about the hinge pin 82. This movement is the reverse of that movement occasioned by a forward movement of the rod 72 and thus it causes the horizontally disposed plate 90 to be pushed backwardly into its position as shown in Figure 2 wherein the crossbar 63 is moved transversely in the other direction to effect a re-engagement of the clutch 47.

A flange 104 on an upper corner of the plate 81 constitutes a spaced apart projection from the projection 103 and provides a means of contact for the link 102 when the hand engaging lever 100 is pulled upwardly and thus it should be evident that when the lever 100 is pulled sufficiently far the link 102 will engage the flange 104 causing a swinging of the vertically hinged plate 81 in the same direction as occasioned by the forward pulling of the link 72 and thus the clutch 47 may be manually disengaged.

A spring 105 is fastened at its lower end at 106 at the point of connection between the hand lever 100 and the link 102. The other end of the spring 105 as shown at 107 is attached to a stationary bracket 108 which is welded or otherwise fastened at 109 to a flanged portion 110 of the stationary support member 80. As viewed in Figure 3 the center line of the spring lies slightly to the right of the hinge pin 82, thus normally urging the link 102 into engagement with the projection 103. It is not to be understood that the spring 105 is sufficiently strong to cause a re-engagement of the clutch without a manual movement of the hand lever 100. The spring 105 merely acts as an over-center arrangement to hold the link 102 in either abutting relationship with the projection 103 or the spaced apart projection flange 104.

In the operation of the device of this invention the disengagement of the wagon elevator clutch is accomplished when the operator of the implement raises the crop gathering units to a transport position or to a position required for turning at the end of a row. The disengagement of the wagon elevator clutch is automatically accomplished by the maximum raising of the gathering units and the operator need not separately remember to disengage the drive for the wagon elevator. The raising of the gathering units 17 causes a simultaneous forward and upward swinging of the auxiliary depending arm 67 which through the medium of the spring 76 and the washer and lock nuts 75 and 74 cause a forward pulling of the connecting rod 72. This immediately pulls forwardly on the connecting rod 85 and also causes a pushing on the link 102 by reason of the engagement of the projection 103 against the side thereof. The link 102 need not move very far before the center line of the spring 105 passes the hinge pin 82, such as shown in Figure 5, at which point the spring 105 causes the link 102 to be suddenly pulled upwardly to the dash line position of the link 102 in Figure 5, at which point it strikes the flange 104 of the plate 81 with a sufficient impact insuring a positive extra pull on the link 85 and thus a more certain disengagement of the clutch 47. When the clutch is disengaged, as previously explained, it will not be automatically re-engaged but rather re-engagement is necessarily accomplished by a manual downward pushing movement on the hand lever 100. The operator thus pushes the hand lever 100 downwardly against the action of the spring 105 to a position where the link 102 contacts the projection 103 on the plate 81 whereafter the plate moves with the link 102 and continued downward movement of the hand lever 100 causes a re-engagement of the clutch 47.

Numerous details of construction may be varied throughout a wide range without departing from the principles disclosed herein and I, therefore, do not propose limiting the patent granted hereon otherwise than as necessitated by the appended claims.

What is claimed is:

1. For a field traversing harvesting implement having a trailing wagon hitched thereto, a driving means for said harvesting implement, a wagon elevator driven by said driving means, said wagon elevator attached to said harvesting implement and adapted to elevate harvested crops to said trailing wagon, a clutch on said harvesting implement interposed between said driving means and said driven wagon elevator, and clutch actuation means comprising a transversely disposed bar carried on said harvesting implement for transverse sliding movement, a clutch operating fork, said fork attached to said bar and arranged whereby transverse movement of said bar causes engagement or disengagement of said clutch, a horizontally disposed plate carried on said harvesting implement for swinging movement in a horizontal plane about a loosely positioned pivot, said transversely disposed bar attached to said horizontally disposed plate and receiving its sliding movement from swinging movement of said horizontally disposed plate, and linkage means on said harvesting implement causing swinging movement of said horizontally disposed plate.

2. A link urging means comprising a harvesting implement, a vertically disposed plate hingedly connected to said harvesting implement for swinging movement in a vertical plane, means causing swinging of said vertically disposed plate, said vertically disposed plate including spaced apart projections thereon spaced from said hinge connection to said harvesting implement, a link hingedly mounted on said harvesting implement having a common center with the hinge connection for said vertically disposed plate, said link disposed between said spaced apart projections, a spring fastened at one end to said harvesting implement and at its other end to said link spaced from said hinge mounting, said spring arranged to act on an over-center manner whereby the link is urged either toward one projection or the other, and said means for causing swinging of said vertically disposed plate including lever means engaging said link for the purpose of moving said link against one of said plate projections to accomplish swinging movement of said vertically disposed plate.

3. A device as set forth in claim 2 in which a longitudinally movable connecting rod is attached to said vertically disposed plate to cause a direct swinging movement of said vertically disposed plate, and whereby swinging movement of said vertically disposed plate causes a swinging movement of said link by engagement thereof by one of said plate projections resulting in an over-center swinging of said link to the other of said projections.

4. For a field traversing harvesting machine having a trailing wagon hitched thereto, a power operated wagon elevator attached to said harvesting machine and adapted to elevate harvested crops to said trailing wagon, said harvesting machine having vertically adjustable gathering units at the forward end thereof, a clutch on said harvesting machine for controlling drive to said power operated wagon elevator, and actuator means for said clutch comprising a clutch shifting fork, a transversely disposed bar journalled for transverse sliding movement on said harvesting machine, said bar connected at one end thereof to said clutch shifting fork, means associated with said bar for causing engagement or disengagement of said fork, said means including a first plate substantially vertically disposed and hinged on said harvesting machine, a second plate substantially horizontally disposed and hinged on said harvesting machine, and means joining said plates whereby a longitudinal swinging movement of said first plate is converted to transverse movement of the said second plate for direct sliding movement of said transversely disposed bar, means responsive to a raising of said gathering units to effect a movement of said linkage means to cause only a disengagement of said clutch and manual operable means joining said linkage means to cause a re-engagement of said clutch.

*5. In a harvester having a mobile frame, a crop-gathering unit connected thereto for adjustment between raised and lowered positions and including a member movable as an incident to such adjustment, and a conveyor connected to the frame and positioned to receive crops from the unit and having drive means including a clutch biased into engagement and a movable clutch part: the improvement comprising: a one-way force-transmitting connection between the movable clutch part and the movable member for disengaging the clutch only upon raising of the unit; selectively releasable and lockable means connected to the clutch and automatically lockable to retain the clutch disengaged upon raising of the unit, said one-way force-transmitting means enabling lowering of the unit with the clutch so retained, and said selective means being releasable to enable biased re-engagement of the clutch after lowering of the unit; and control means separate from the unit and movable*

*member and connected to the movable clutch part for moving the clutch part to disengage the clutch, said one-way force-transmitting connection enabling operation of said control means while the unit is in its lowered position.*

*6. The invention defined in claim 5, including: means interconnecting the control means and the selective means for effectuating retention and release of the clutch upon operation of the control means.*

*7. In a harvester having a mobile frame, a crop-gathering unit connected thereto for adjustment between raised and lowered positions and including a member movable as an incident to such adjustment, and a conveyor connected to the frame and positioned to receive crops from the unit and having drive means including a clutch biased into engagement: the improvement comprising: a one-way force-transmitting connection between the clutch and the movable member for disengaging the clutch only upon raising of the unit; a lever member fulcrumed on the frame and biased for movement from a first position to a second position; link means connected to the lever member and deriving force from disengagement of the clutch to move the lever member from its first position to its second position; locking means associated with the lever member for automatically and releasably locking it in its second position to retain disengagement of the clutch, said one-way force-transmitting means enabling lowering of the unit with the clutch so retained, and said locking means being releasable to enable biased reengagement of the clutch after lowering of the unit; and control means separate from the unit and movable member and connected to the clutch for disengaging the clutch, said one-way force-transmitting connection enabling operation of said control means while the unit is in its lowered position.*

*8. The invention defined in claim 7, in which: the locking means is effected by such relationship between the link means and the fulcrum of the lever member that said lever member in moving from its first position to its second position moves past a dead-center position and thus retains the clutch in its disengaged condition.*

*9. In a tractor-mounted harvester having a crop-gathering unit mounted for adjustment between raised and lowered positions, a drawbar on the tractor, a member on the tractor above the drawbar and movable incident to adjustment of the unit, and a conveyor on the drawbar including drive means having a clutch below the movable member and biased into engagement: the improvement comprising a lever rockable on the drawbar intermediate the movable member and the clutch and having first and second arms; link means connecting the first arm to the clutch; one-way force-transmitting means connecting the second arm to the movable member for rocking of the lever to disengage the clutch only upon movement of the member incident to raising of the unit; and releasable retaining means connected to the tractor and to the second arm of the lever and automatically lockable to retain the lever against return rocking under action of the clutch bias when the member moves incident to lowering of the unit, such movement of the member being permitted because of said one-way force-transmitting means; and said releasable retaining means being subsequently releasable to enable return rocking of the lever and re-engagement of the clutch after the unit is lowered.*

*10. In a tractor-mounted harvester having a crop-gathering unit mounted for adjustment between raised and lowered positions, a drawbar on the tractor, a member on the tractor above the drawbar and movable incident to adjustment of the unit, and a conveyor on the drawbar including drive means having a clutch below the movable member and biased into engagement: the improvement comprising a lever rockable on the drawbar intermediate the movable member and the clutch and having first and second arms; link means connecting the first arm to the clutch; one-way force-transmitting means connecting the second arm to the movable member for rocking of the lever to disengage the clutch only upon movement of the member incident to raising of the unit; and separate control means independent of the unit and movable member and including a tractor-borne movable element and a force-transmitting connection between said element and the second arm of the lever, said element being movable from a first position to a second position for rocking said lever to disengage the clutch in the absence of movement of the movable member.*

*11. The invention defined in claim 9, including: releasable retaining means associated with the tractor-borne element and automatically effective to lock said element in its second position and thereby to retain the disengaged condition of the clutch.*

References Cited in the file of this patent or the original patent

UNITED STATES PATENTS

| | | |
|---|---|---|
| 2,323,087 | Everett | June 29, 1943 |
| 2,527,802 | Dwyer | Oct. 31, 1950 |
| 2,527,823 | Karlsson et al. | Oct. 31, 1950 |
| 2,544,911 | Aasland | Mar. 13, 1951 |